United States Patent [19]

Woodling

[11] 4,036,031
[45] July 19, 1977

[54] UNIVERSAL CONNECTION MEANS IN AN ORBITAL FLUID PRESSURE DEVICE

[76] Inventor: George V. Woodling, 22077 Lake Road, Rocky River, Ohio 44116

[21] Appl. No.: 614,145

[22] Filed: Sept. 17, 1975

Related U.S. Application Data

[63] Continuation of Ser. No. 494,057, Aug. 2, 1974, abandoned.

[51] Int. Cl. .............................................. F16d 3/18
[52] U.S. Cl. ........................................... 64/7; 64/6; 64/9 R; 64/23; 64/31; 418/61 B
[58] Field of Search ............... 64/9 R, 23, 6, 31, 7; 418/61 B

[56] References Cited

U.S. PATENT DOCUMENTS

| | | | |
|---|---|---|---|
| 1,311,679 | 7/1919 | Chalifoux | 64/7 |
| 3,288,034 | 11/1966 | White, Jr. et al. | 418/61 B |
| 3,405,603 | 10/1968 | Woodling | 64/9 |
| 3,771,905 | 11/1973 | Ohrberg et al. | 418/61 B |
| 3,782,866 | 1/1974 | McDermott | 64/31 |
| 3,841,801 | 10/1974 | Stralason et al. | 418/61 B |
| 3,853,436 | 12/1974 | Ohrberg | 418/61 B |

*Primary Examiner*—Samuel Scott
*Assistant Examiner*—Randall Heald
*Attorney, Agent, or Firm*—Woodling, Krost, Granger & Rust

[57] ABSTRACT

Universal connection means between a wobble shaft and rotatable body in an orbital fluid pressure device, said rotatable body having a body axis, said wobble shaft having a shaft axis disposed to intersect said body axis, said rotatable body including an internal polygonal socket configuration, said wobble shaft including an external polygonal head configuration, said internal and external configurations interfittingly engaging each other for transmitting torque therebetween in a torque transmitting direction, said polygonal configurations providing universal relative movement therebetween in all directions other than in said torque transmitting direction, said polygonal configurations including at least an internal torque transfer wall and an external torque transfer wall confronting each other and disposed for relative universal movement, one of said transfer walls comprising substantially flat wall means and the other comprising substantially contour wall means, said flat wall means and said contour wall means upon transmission of torque defining at least a polygonally disposed line segment contact therebetween.

27 Claims, 15 Drawing Figures

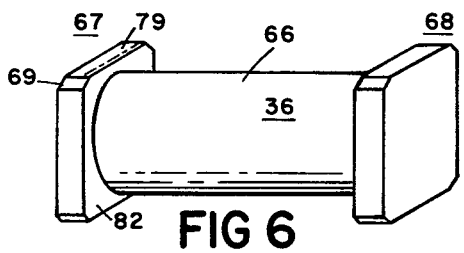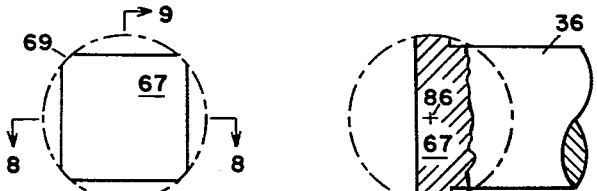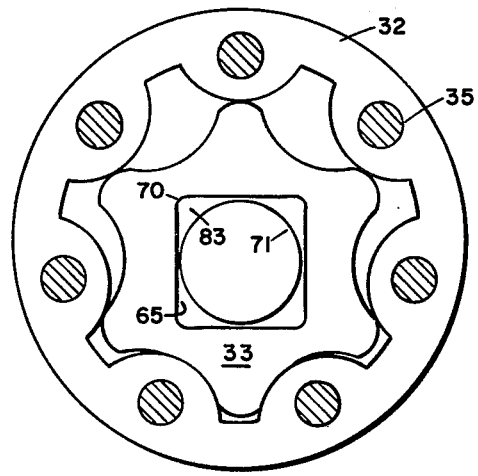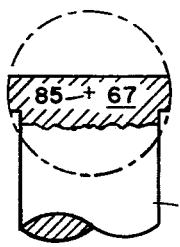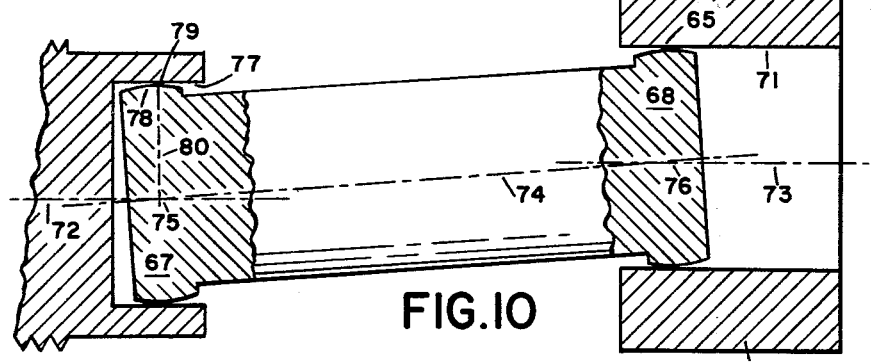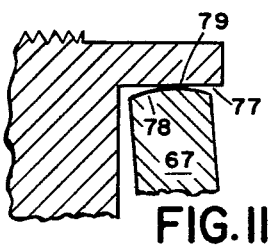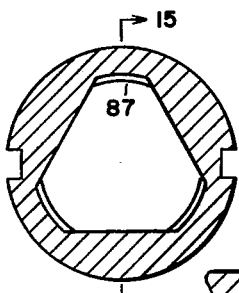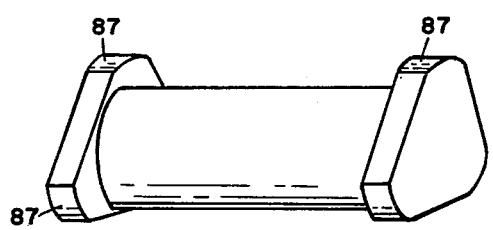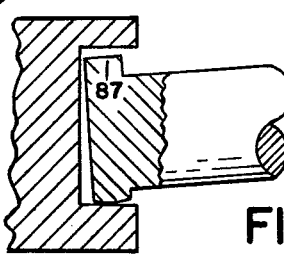

UNIVERSAL CONNECTION MEANS IN AN ORBITAL FLUID PRESSURE DEVICE

This is a continuation of application Ser. No. 494,057 filed Aug. 2, 1974, now abandoned.

BACKGROUND OF THE INVENTION

The wobble shaft, sometimes referred to as an universal shaft, is regarded as the weakest link in the drive mechanism of an orbital fluid pressure device. The function of the wobble shaft is to universally connect the Gerotor and the main shaft. In prior devices, the universal connection depended upon interfitting male and female spline teeth. These teeth provided universal relative movement therebetween in all directions other than in the direction that torque was transmitted. They were not only weak mechanically but also were subject to an excessive amount of wear, which when it occurred affected the timing of the Gerotor.

Accordingly, it is an object of my invention to provide a wobble shaft which is mechanically strong and free from excessive wear.

Another object is the provision of universal connection means including an internal polygonal socket configuration and an external polygonal head configuration interfittingly engaging each other for transmitting torque therebetween.

Another object is to provide for universal relative movement between the polygonal configurations in all direction other than in the direction that torque is being transmitted.

Another object of the provision whereby the external polygonal head configuration is defined by three substantially cylindrical surfaces.

Another object is whereby the interfitting polygonal configurations include at least flat wall means and contour wall means confrontingly engaging each other.

Another object is whereby the interfitting polygonal configurations upon the transmission of torque define at least a polygonally disposed line segment contact therebetween.

Another object is whereby the axis of the wobble shaft intersects the axis of the main shaft at an universal point and also intersects the axis of the rotor of the Gerotor at another universal point and whereby a line passing through an universal point and substantially perpendicular to the flat wall means of a polygonal configuration intersects said line segment contact.

SUMMARY OF THE INVENTION

The invention constitutes universal connection means between first and second rotatable body means in an orbital fluid pressure device, said first body means having a first body axis, said second body means having a second body axis, said first body axis and said second body axis being disposed to intersect each other at an universal point, one of said body means including an internal polygonal socket configuration and the other body means including an external polygonal head configuration, said internal and external polygonal configurations interfittingly engaging each other for transmitting torque therebetween in a torque transmitting direction, said polygonal configurations providing universal relative movement therebetween in all directions other than in said torque transmitting directions, said polygonal configurations including at least an internal torque transfer wall and an external torque transfer wall confrontingly engaging each other, one of said transfer walls comprising substantially flat wall means and the other comprising substantially contour wall means, said flat wall means and said contour wall means having freedom from body interference upon relative universal movement therebetween, said flat wall means and said contour wall means upon transmission of torque defining at least a polygonally disposed line segment contact therebetween.

BRIEF DESCRIPTION OF THE DRAWINGS

Other objects and a fuller understanding of this invention may be had by referring to the following description and claims, taken in conjunction with the accompanying drawings, in which:

FIG. 5 is a view, taken along the line 5—5 of FIG. 1, showing a side view of a Gerotor with an internal polygonal socket configuration provided therein;

FIG. 6 is a perspective view of the universal shaft which comprises a round body having substantially rectangular polygonal heads on opposite ends thereof, wherein the polygonally disposed torque transmitting edge walls of the heads are substantially cylindrical;

FIG. 7 shows an end view of a polygonal head of the universal shaft in FIG. 6, and, in the interest of clarity, the torque transmitting edge walls in this view are not shown as being cylindrical because the amount of the cylindrical contour is too small to illustrate in the end view;

FIG. 8 is a cross-sectional view, taken along the line 8—8 in FIG. 7, and illustrates the fact that the opposite vertical torque transmitting edge walls of the polygonal head in FIG. 7 are substantially cylindrical;

FIG. 9 is a cross-sectional view, taken along the line 9—9 in FIG. 7, and illustrates the fact that the opposite horizontal torque transmitting edge walls of the polygonal head in FIG. 7 are substantially cylindrical;

FIG. 10 is an enlarged view, partly in section, of the universal shaft and illustrates how it interconnects the main shaft and the rotor of the Gerotor in an orbital fluid pressure device;

FIG. 11 is a fragmentary view of FIG. 10, greatly enlarged, to illustrate the fact that the confronting walls of the interfitting polygonal configurations respectively comprise substantially flat wall means and contour wall means, wherein the contour wall means is substantially cylindrical;

FIG. 12 is a view similar to FIG. 11 and shows a modification of the contour wall means, in that the intermediate portion thereof may be almost flat instead of being completely cylindrical;

FIG. 13 is a modification of the polygonal heads for the wobble shaft, in that they are substantially triangular instead of being substantially rectangular;

FIG. 14 is a perspective view of the modified wobble shaft, similar to FIG. 6, but shows triangular polygonal heads; and FIG. 15 is a cross-sectional view, taken along the line 15—15 of FIG. 13, and shows the relationship of the bottom confronting edge wall of the interfitting triangular configurations.

DESCRIPTION OF THE PREFERRED EMBODIMENT

For clarity of invention, the usual static seals for the housing and the seal for the rotating shaft are not shown. Also, all wear parts are made of hardenable surfaces and are well lubricated by the operating fluid.

Figure 1:
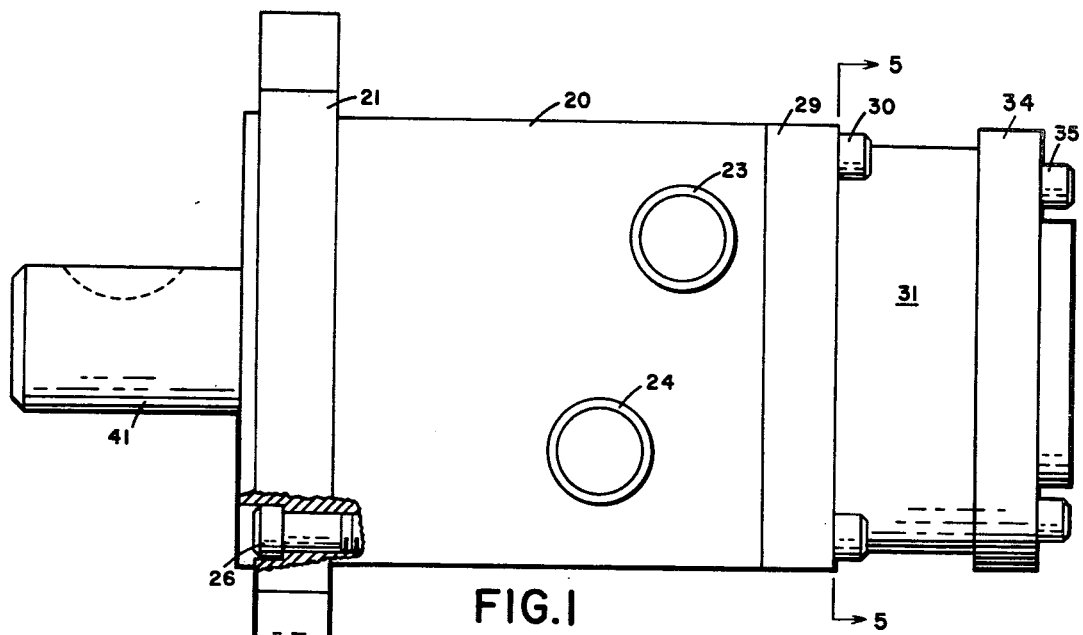
FIG. 1 is a top view of an orbital fluid pressure device embodying the features of my invention.

With reference to the drawing, the orbital fluid pressure device in which my invention may be incorporated, comprises generally a main housing 20 having substantially a square cross-section. A mounting flange 21 may be secured to the left-hand end of the housing by means of suitable screws 26 (one of which is shown in FIG. 1). The housing 20 is hollow from end-to-end, and intermediate the ends of the hollow-housing there is provided an annular internal rim 22 which generally separates the hollowhousing into a left-hand end compartment and a right-hand end compartment. Rotatively mounted in the left-hand end compartment is a main load shaft 25 having an axis substantially coinciding with the longitudinal axis of the fluid pressure device. A bushing 27 and a rotary valve 28 are mounted in the right-hand end compartment. On the right-hand end of the hollow-housing, there is mounted a square stationary valve member 29 by means of suitable screws 30. The rotary valve is adapted to be rotated relative to the stationary valve member 29 for controlling the entrance of fluid to and the exit of fluid from the Gerotor shown in FIG. 5, hereinafter referred to as a stator-rotor mechanism 31 comprising a stator 32 and a rotor 33. An end cap 34 encloses the stator-rotor mechanism 31. The stator-rotor mechanism 31 and the end cap 34 are secured to the stationary valve member 29 by means of screws 35. Fluid is delivered to and from the housing 20 through a pair of fluid ports 23 and 24. The universal shaft is identified by the reference character 36 and interconnects the main shaft 25 with the rotor 33 of the stator-rotor mechanism 31 and is adapted to transmit torque therebetween.

The main shaft 25 comprises an enlarged internal portion having a reduced external portion 41 extending axially outwardly of the main housing 20 through the mounting flange 21. The enlarged internal portion of the main shaft is supported preferably by tapered roller bearings 42 and 43 disposed side-by-side with the bearing 42 disposed oppositely to that of the tapered roller bearing 43. Thus, the tapered roller bearings 42 and 43, in combination with each other, provide for radial thrust as well as for end thrust in both axial directions, while the tapered roller bearing 42 disposed to take the greater part of the radial load. A tightening nut 54 which threadably engages male threads 55 secure the bearings 42 and 43 against axial movement upon the main shaft. The tightening nut 54 may be provided with a built-in locking feature to prevent loosening.

As shown, the bearings 42 and 43 are secured against axial movement in the housing by axial fixation means, indicated by the reference character 60. The axial fixation means 60 is located within a bore 62 of the flange and comprises an annular V-shaped or pointed rib which axially abuts against a transversely disposed solid abutment wall of the bearing 42. The rib may be constructed either integrally with or as a separate part from the flange 21. By pressing the flange 21 against the end of the housing 20 during assemly, the pointed rib is coined against the bearing 42, with the result that the fixation means accommodates for axial tolerance in matching the position of the bearings in the housing. The pressure required to coin the axial fixation means is greater than the end-wire thrust load to which the bearing means 42 may be subjected in operation, in which case the bearings 42 and 43 are resisted against axial movement in operation. The main shaft is entirely supported by the two tapered roller bearings 42 and 43. The reduced external shaft portion 41 where it passes axially through the end mounting flange 21 is not journalled therein but rotates therein with a small radial clearance which is adapted to be sealed off by suitable shaft seal means, not shown. The axial fixation-means 60, after being coined, provides a fluid seal between the housing and the flange.

Figure 2:
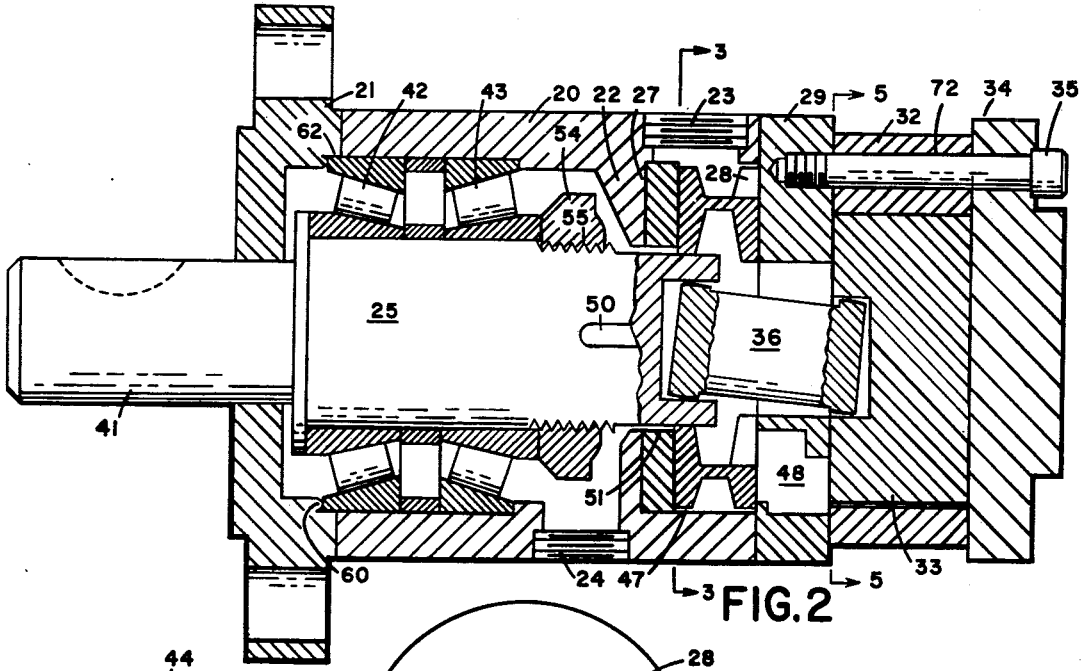
FIG. 2 is a longitudinal sectional view of FIG. 1, except that the section through the fluid ports and rotary valve is taken along a line other than a vertical center line, and showing the fluid ports in the housing in section as well as illustrating both the outside and inside rotary valve commutating parts which appear unshaded.

The bearings 42 and 43 constitute common bearing means for the main shaft 25 and the rotary valve 28. The common bearing means directly support the main shaft 25 and indirectly support the rotor valve 28 through extension drive means comprising a male shank 44 which extends axially from the load shaft 25 into the right-hand compartment for driving connection with the rotary valve 28 for rotating same relative to the stationary valve 29. The male shank 44 slidably fits within a female mounting hole 46 provided in the rotary valve 28, see FIGS. 2, 3 and 4. This connection comprises a nonrotatable connection, whereby a boss or tongue 45 fits into one of the side grooves 50 in the male shank and rotates the rotary valve upon rotation by the main shaft. The unoccupied side groove 50 functions as a fluid passageway which provides fluid communication between the fluid port 24 and the inside of the rotary valve 28. The nonrotatable connection also provides slidable axial movement between the rotary valve 28 and the male shank 44 to accommodate for axial movement of the load shaft without interfering with the operation of the rotary valve. The axial slidably movement which is permitted between the male shank 44 and the rotary valve 28 is greater than the maximum distance that the load shaft 25 may move in the axial direction during operation. As illustrated in FIG. 2, the rotary valve 28 and the second compartment means in which it is mounted has a radial clearance 47 therebetween to accommodate for radial movement of the load shaft without interfering with the operation of the rotary valve. The radial clearance 47 is greater than the maximum distance that the load shaft 25 may move in a radial direction during operation.

The operation of the rotary valve relative to the stationary valve provides for controlling the entrance of fluid to and the exit of fluid from the stator-rotor mechanism. The action of the rotary valve 28 in commutation with the stationary valve is such that there is a first series of commutating fluid connections between the fluid port 23 and the stator-rotor mechanism and a second series of commutating fluid connections between the stator-rotor mechanism and the fluid port 24. The stationary valve 29 has a plurality of circumferentially disposed openings 48 which extend therethrough to provide for fluid communication between the rotary valve 28 and the stator-rotor mechanism. The commutating valve action, and the flow of fluid between the fluid ports 23 and 24 and the stator-rotor mechanism is such that the fluid flow is regulated to be in timed sequence to that of the Gerotor. The annular channel around the outside of the rotary valve is in constant communication with the fluid port 23 and the central space inside the rotary valve is in constant communication with the fluid port 24 through the unoccupied side grooves 50.

Figures 3, 4:
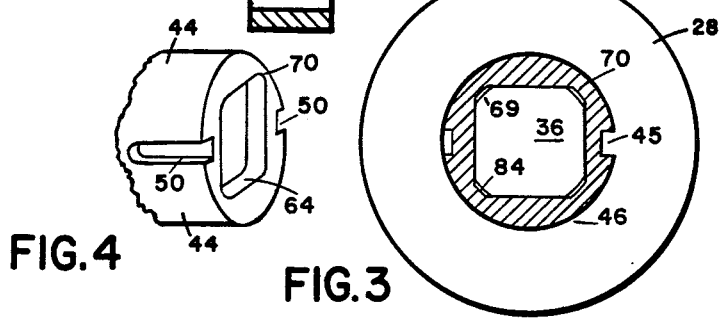
FIG. 3 is a view, taken along the line 3—3 of FIG. 2, showing a cross-section of the terminal shank portion of the main shaft, including the internal polygonal socket, the view also showing a female mounting hole in the rotary valve which is adapted to fit around the shank portion of the main shaft and which is non-rotatively secured thereto by an inwardly projecting boss or tongue fitting into one of the side grooves in the shank portion.
FIG. 4 is a perspective view of the shank portion of the main shaft, showing the internal polygonal socket configuration provided therein, the view also showing two side notches or grooves in the opposite sides of the shank portion, one of the grooves being adapted to receive the boss or tongue of FIG. 3 and the other groove serving as a fluid passageway.

The universal shaft 36 is adapted to make a polygonal universal connection with the main shaft 25 and the rotor 33 of the Gerotor. As illustrated in FIGS. 4 and 5, the male shank 44 and the rotor 33 are both provided with an internal polygonal socket configuration, indicated respectively by the reference characters 64 and 65. As shown in FIG. 6, the universal shaft 36 comprises a round portion 66 and two external polygonal heads 67 and 68 adapted respectively to fit within the two internal polygonal sockets 64 and 65. Both of the polygonal heads 67 and 68 respectively define a larger cross-sectional area than that of the round portion 66. The corners of the polygonal heads, one of which being identified by the reference character 69, comprises external cylindrical surfaces defining a longitudinal axis substantially coinciding with the shaft axis of the universal shaft 36. The cylindrical corners 69 constitute external juncture wall means for interconnecting the end portions of the polygonally disposed torque transmitting edge walls of the polygonal head. Also, the internal polygonal sockets respectively have internal cylindrical corners, one of which is identified by the reference character 70, see FIGS. 3, 4 and 5. A clearance 84 is provided between the external polygonal corners 69 and the internal polygonal corners 70. The cylindrical corners adjoin the end portions of the polygonally disposed torque transmitting edge walls of the polygonal configurations. The polygonal heads of the wobble shaft define polygonal side corner shoulder walls 82 which extend outwardly from the round body portion 66. With reference to FIGS. 7, 8 and 9, the torque tranmitting edge walls of the heads are substantially cylindrical. Thus, each head, in FIG. 6, includes at least first, second, third and fourth torque transfer edge walls, defining substantially a rectangle. The first and second transfer walls are shown as being the vertical edges in FIG. 7 and the third and fourth torque transfer walls are shown as being the horizontal edges in FIG. 7. As shown in FIG. 8, the vertical edges comprise cylindrical contour wall means defining a transverse head axis 85 passing cross wise through the axis of the wobble shaft. In FIG. 9, the horizontal edges comprise cylindrical contour wall means defining transverse head axis 86 passing cross wise through the wobble shaft axis. The transverse head axes 85 and 86 are disposed substantially ninety degrees apart from each other.

In FIG. 5, the rotor 33 is provided with an opening 71 which extends therethrough, leaving polygonally disposed corner shoulders 83 which function as abuttable stop means against which the polygonal side corner shoulder walls 82 of the polygonal head of the universal shaft may engage to keep the head from moving axially through the rotor 33. The opening 71 aids in hydraulically balancing the rotor 33 in an axial direction between the end cap 34 and the stationary valve 29.

The FIG. 10 shows the universal shaft interconnecting the main shaft and the rotor 33. The line 72 represents the axis of the main shaft, the line 73 represents the axis of the orbital rotor 33, and the line 74 represents the axis of the universal shaft which intersects the axis 72 at an universal point 75 and which intersects the axis 73 at an universal point 76. The axis 73 of the orbital rotor 33 is eccentrically displaced with reference to the axis 72 of the main shaft.

The internal polygonal socket configurations and the external polygonal head configurations interfittingly engage each other for transmitting torque therebetween in a torque transmitting direction, and provide for freedom from body interference upon universal relative movement therebetween in all other directions. As shown in FIG. 10, the internal socket configurations include at least an integral torque transfer wall 77 and the external head configurations include at least an external torque transfer wall 78 confronting each other. The internal torque transfer wall 77 comprises substantially the flat wall means and the external torque transfer wall 78 comprises substantially contour wall means. Accordingly, the flat wall means and the contour wall meanc have freedom from body interference upon relative universal movement therebetween with substantially no backlash. The flat wall means and the contour wall means upon the transmission of torque define at least a polygonally disposed line segment contact therebetween. The line segment contact is shown as a point 79 in FIG. 18 and as a dash-dot-line in FIG. 6. A reference line 80, which passes through the universal point 75 and substantially perpendicular to the flat wall means 77, increases the line segment contact 79.

An enlargement of the engagement betweem the flat wall means and the contour wall means is shown in FIG. 11 and illustrates the act that the clearance difference therebetween, which provides for freedom from body interference, is minute in the order of a few thousandths of an inch. Accordingly, in actual practice, the line segment contact is more like a narrow band instead of a thin line. The narrow band contact provides for long wear. In FIG. 12, because of the minute clearance, the intermediate portion 81 of the contour wall means may be substantially flat with the opposite end portions being arcuate as in FIG. 11. In the Claims, the expression "contour wall means" includes that shown in FIG. 12, as well as that shown in FIG. 11, or any other modification which allows for freedom from body interference therebetween. The FIGS. 7, 8 and 9 as well as the FIGS. 11 and 12 illustrate the fact that the contour wall means is substantially cylindrical and defines a body axis passing through the universal point 75.

In FIGS. 2 to 10, the polygonal configurations are shown as being that of a rectangle. In FIGS. 13, 14 and 15, the configurations are shown as being that of a triangle.

As illustrated, the cylindrical corner portions 87 for the triangular configurations are cylindrical and define a longitudinal axis substantially in axial alignment with that of the universal shaft. The operation of the triangular configurations is substantially the same as that for the rectangular configurations. The FIGS. 11 and 12 apply to both that of a rectangle and that of a triangle.

The opposite contour edge walls of the rectangle are that of a cylinder and the opposite contour edge walls of the triangle are that of a cone. But each contour edge wall, whether that of a rectangle or that of a triangle are in fact cylindrical with respect to the flat wall means of a socket. Thus, the term "cylindrical" as applied to the contour wall means includes both that of a rectangle and that of a triangle.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Universal connections means between first and second rotatable body means is an orbital fluid pressure device, said first body means having a first body axis, said second body means having a second body axis, said first body axis and said second body axis being disposed to intersect each other at an universal point, one of said body means including an internal polygonal socket configuration and the other body means including an external polygonal head configuration, said internal and external polygonal configurations interfittingly engaging each other for transmitting torque therebetween in a torque transmitting direction, said polygonal configurations providing universal relative movement therebetween in all directions other than in said torque transmitting directions, said polygonal configurations including at least an internal torque transfer wall and an external torque transfer wall confrontingly engaging each other, one of said transfer walls comprising substantially flat wall means and the other comprising substantially contour wall means, said flat wall means and said contour wall means having freedom from both interference upon relative universal movement therebetween, said flat wall means and said contour wall means upon transmission of torque defining at least a polygonally disposed line segment contact therebetween.

2. The structure of claim 1, wherein said contour wall means is substantially cylindrical.

3. The structure of claim 1, wherein a line passing through said universal point and substantially perpendicular to said flat wall means intersects said line segment contact.

4. The structure of claim 1, wherein one of said body means comprises an universal shaft having substantially a round body portion and at least a polygonal head portion, said polygonal head portion defining a larger cross-sectional area than that of said round body portion.

5. The structure of claim 4, wherein said polygonal head portion defines polygonal side corner shoulder walls extending outwardly from said round body portion.

6. The structure of claim 1, wherein said internal polygonal body configuration includes a plurality of internal torque transfer walls and a plurality of internal round corner portions adjoining said torque transfer walls.

7. The structure of claim 6, wherein said internal round corner portion are substantially cylindrical.

8. The structure of claim 1, wherein said external polygonal body configuration includes a plurality of external torque transfer walls and a plurality of external round corner portions adjoining said torque transfer walls.

9. The structure of claim 8, wherein said external round corner portion are substantially cylindrical.

10. The structure of claim 1, wherein one of said body means comprises an universal shaft having a shaft axis, said shaft having a polygonal head portion including at least first, second, third and fourth torque transfer walls and external round corner portions interconnecting said torque transfer walls, said first and second transfer walls comprising first contour wall means defining a first transverse head axis passing substantially through said shaft axis in a cross-wise direction, said third and fourth transfer walls comprising second contour wall means defining a second transverse head axis passing substantially through said shaft axis in a cross-wise direction, said external round corner portions defining a longitudinal axis substantially coinciding in an axial direction with said shaft axis.

11. The structure of claim 10, wherein said first transverse head axis and said second transverse head axis are disposed substantially ninety degrees apart from each other.

12. The structure of claim 1, wherein said internal and external polygonal body configurations respectively define substantially a rectangle.

13. Universal Torque mechanism for transmitting torque between first and second torque members disposed axially apart from each other, said first torque member having a first longitudinal center line, said second torque member having a second longitudinal center line, one of said center lines comprising a fixed axis and being parallel to and laterally off-set in a radial direction with respect to each other, a shaft interconnecting said first and second torque members, said shaft having first and second end portions and having a shaft axis disposed to intersect said longitudinal center lines, said shaft axis intersecting said first longitudinal center line at a first point and intersecting said second longitudinal center line at a second point, one of said points being an universal point, said first torque member and said first shaft end portion comprising a first polygonal pair, said second torque member and said second shaft end portion comprising a second polygonal pair, said end portions of said shaft being respectively abuttable in an axial direction against said first and second torque members to limit axial movement of said shaft therebetween, said first and second polygonal pairs respectively defining internal and external polygonal body configurations interfittingly engaging each other for respectively transmitting torque therebetween in a torque transmitting direction, said internal and external polygonal body configurations of each pair providing universal relative movement therebetween in all directions other than in said torque transmitting direction, said internal and external polygonal body configurations of each pair including at least a first torque transfer wall and a second torque transfer wall, one of said transfer walls comprising substantially flat wall means and the other comprising substantially contour wall means, said flat wall means and said contour wall means confrontingly engaging each other and having freedom from body interference therebetween, said flat wall means and said contour wall means upon transmission of torque defining at least a polygonally disposed line segment contact therebetween, a line passing through said universal point and substantially perpendicular to said flat wall means intersecting said line segment contact.

14. The structure of claim 13, wherein said contour wall means is substantially cylindrical.

15. Universal shaft means for interconnecting first and second rotatable members in an orbital fluid pressure device, said first rotatable member having a first axis, said second rotatable member comprising an orbital member and having a second axis eccentrically displaced relative to said first axis, said shaft means having a shaft axis disposed to intersect said first and second axes, said shaft means having first and second external polygonal head configurations, said first and second external polygonal head configurations being axially spaced apart from each other, said first external polygonal head configuration including first polygonally disposed torque transfer wall means, said second external polygonal head configuration including second polygonally disposed torque transfer wall means, said torque transfer wall means respectively comprising substantially contour wall means.

16. The structure of claim 15, wherein said contour wall means are substantially cylindrical.

17. The structure of claim 15, including external round corner portions interconnecting said torque transfer wall means.

18. The structure of claim 17, wherein said external round corner portions are substantially cylindrical.

19. Universal shaft means having a shaft axis and including external polygonal head means, said polygonal head means having external round corner portions defining a body axis substantially coinciding with said shaft axis.

20. The structure of claim 1, wherein said internal and external polygonal configurations respectively define substantially a triangle.

21. The structure of claim 1, wherein said internal and external transfer walls closely engage each other and provide substantially no backlash therebetween.

22. Mechanism including inner and outer relatively movable body members having a combined relative movement therebetween comprising a relative orbital movement and a rotational movement, one of said body members being rotatable about a rotatable axis displaced relative to that of the other body member and having an internal polygonal body configuration including polygonally disposed internal side walls having adjoining edges, cylindrical corner portions between said adjoining edges, said cylindrical corner portions respectively, defining an axis substantially parallel to said rotatable axis.

23. Mechanism including inner and outer relatively movable body members having combined relative movement therebetween comprising a relative orbital movement and a rotational movement, one of said body members having a body axis extending transversely, thereof and eccentrically displaced relative to that of the other body member and including an internal polygonal body configuration comprising polygonally disposed internal torque transfer walls and internal round corner portions adjoining said torque transfer walls.

24. The structure of claim 23, wherein said internal round corner portions are substantially cylindrical and respectively define an axis substantially parallel to said body axis.

25. The structure of claim 24, wherein said internal polygonal body configuration comprises a polygonal socket having an open end and an abuttable end, said abuttable end including transversely disposed corner shoulders.

26. Mechanism including inner and outer relatively movable body members having a combined relative movement therebetween comprising a relative orbital movement and a relative rotational movement, one of said body members having an axis and an internal polygonal body configuration including a plurality of internal torque transfer walls and a plurality of internal polygonal corner portions interconnecting said torque transfer walls, said internal torque transfer walls and said polygonal corner portions extending in substantially the same direction as that of said axis.

27. The structure of claim 26, wherein said polygonal corner portions respectively comprise substantially a round corner portion.

* * * * *